United States Patent
Fujisawa et al.

(10) Patent No.: US 6,964,482 B2
(45) Date of Patent: Nov. 15, 2005

(54) OPTICAL ROD, MANUFACTURING METHOD OF OPTICAL ROD, MANUFACTURING JIG OF OPTICAL ROD, AND PROJECTOR EQUIPPED WITH OPTICAL ROD

(75) Inventors: Shohei Fujisawa, Matsumoto (JP); Hideo Yamaguchi, Matsumoto (JP); Kazuyuki Iinuma, Hotaka-machi (JP)

(73) Assignee: Seiko Epson Corporation, Tokyo (JP)

( * ) Notice: Subject to any disclaimer, the term of this patent is extended or adjusted under 35 U.S.C. 154(b) by 78 days.

(21) Appl. No.: 10/613,084

(22) Filed: Jul. 7, 2003

(65) Prior Publication Data

US 2004/0080833 A1 Apr. 29, 2004

(30) Foreign Application Priority Data

Jul. 22, 2002 (JP) .............................. 2002-211941

(51) Int. Cl.[7] ......................... G03B 21/00; G03B 21/14; G02B 6/00; G02B 27/00; G02B 6/26
(52) U.S. Cl. .......................... 353/22; 353/31; 353/121; 359/894; 385/133; 385/52
(58) Field of Search ........................... 353/31, 22, 121; 385/133, 52; 359/894

(56) References Cited

U.S. PATENT DOCUMENTS

| | | | | |
|---|---|---|---|---|
| 3,170,980 | A | * | 2/1965 | Pritchard ..................... 385/133 |
| 5,625,738 | A | * | 4/1997 | Magarill ..................... 385/146 |
| 5,734,768 | A | * | 3/1998 | Kim et al. .................... 385/52 |
| 5,777,789 | A | * | 7/1998 | Chiu et al. .................. 359/494 |
| 6,771,870 | B2 | * | 8/2004 | Strobl et al. ................ 385/133 |

* cited by examiner

Primary Examiner—Rodney Fuller
Assistant Examiner—Magda Cruz
(74) Attorney, Agent, or Firm—Oliff & Berridge, PLC

(57) ABSTRACT

A tubular body having a substantially rectangular cross-section is formed with a plurality of flat plates each having a surface with a light reflecting coating applied thereto. To form the tubular body, the flat plates are disposed in such a manner that the surfaces having the light reflecting coating applied thereto face inward and that an end surface of one of the flat plates at one end is held in contact with the surface of another flat plate. The flat plates are bonded by bonding the end portions thereof with each other on the outer side surfaces of a tubular body so as to form an optical rod.

22 Claims, 7 Drawing Sheets

OPTICAL ROD, MANUFACTURING METHOD OF OPTICAL ROD, MANUFACTURING JIG OF OPTICAL ROD, AND PROJECTOR EQUIPPED WITH OPTICAL ROD

BACKGROUND OF THE INVENTION

1. Field of the Invention

The present invention relates to an optical rod for making uniform the irradiation of light emitted from a light source, a manufacturing method thereof, a jig for manufacturing an optical rod, and a projector equipped with such an optical rod.

2. Description of the Related Art

Figure 7:
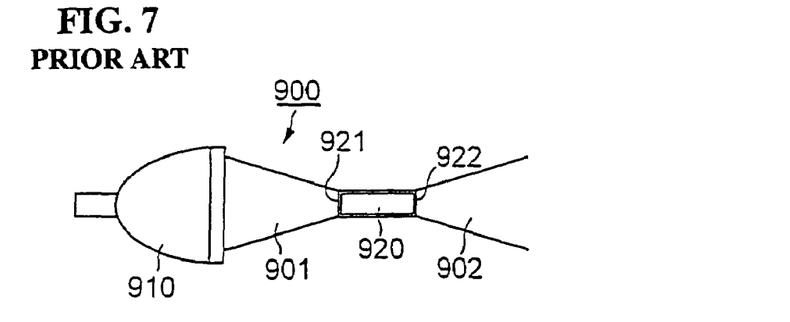
FIG. 7 is a side view of a conventional illumination light source system.

FIG. 7 is a side view illustrating a conventional illumination light source system. In FIG. 7, an illumination light source system 900 comprises a light source 910 and a tubular optical rod (integrator rod) 920. Outgoing light 901 emitted from the light source 910 enters the tube from one end 921 of the optical rod 920 and is reflected on inner walls of the tube.

The number of reflections varies with the angle of incidence of the light beam entering the optical rod 920. Beams subjected to a different number of reflections are all superposed at an end 922 of the optical rod 920, from where the light beams emerge. At this time, the intensity of the superposed light beams becomes almost uniform on the surface at the end 922, from where the beams emerge. By then transferring the superposed beams directly onto an illumination area, such as a display panel, uniform illumination can be achieved.

Figure 8:
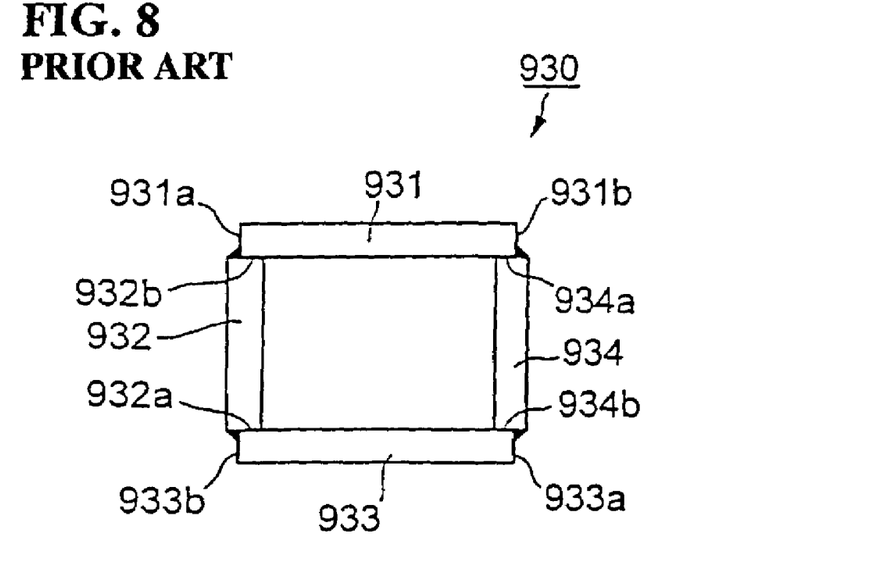
FIG. 8 is an elevation view illustrating an optical rod according to the conventional art 1.

FIG. 8 is an elevation view illustrating an optical rod according to the conventional art 1. As illustrated in FIG. 8, an optical rod 930 has a pair of vertical reflector plates 932 and 934 disposed in parallel and sandwiched between the two ends of a pair of horizontal reflector plates 931 and 933, in such a manner as to form a tubular body having a substantially rectangular cross-section (for example, the width in the horizontal direction is 8.4 mm, the height in the vertical direction is 7 mm, the length in the depth direction 25 mm, and the plate thickness 1.1 mm).

Figure 9:
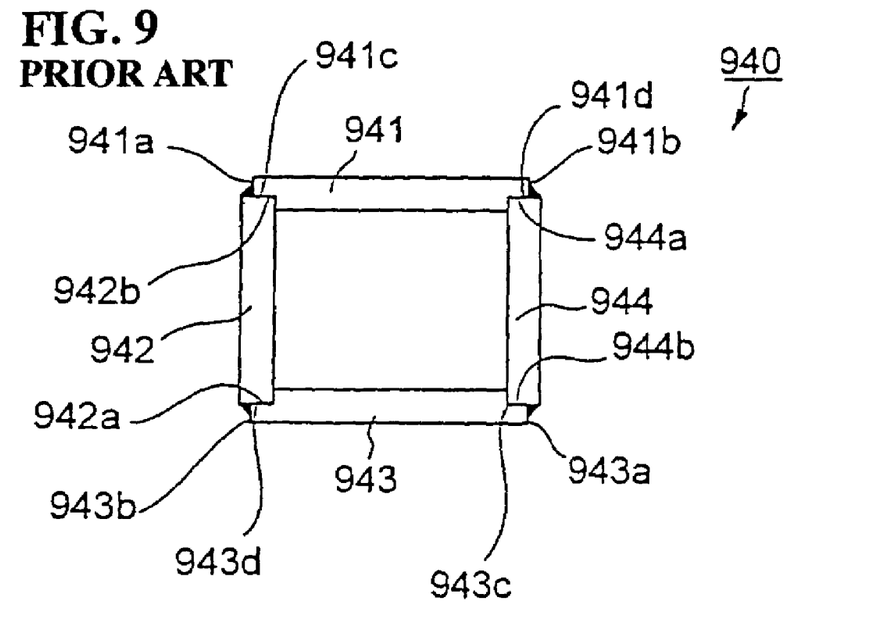
FIG. 9 is an elevation view illustrating an optical rod according to the conventional art 2.

FIG. 9 is an elevation view illustrating an optical rod according to the conventional art 2. As illustrated in FIG. 9, the optical rod 940 has a pair of vertical reflector plates 942 and 944 vertically disposed and sandwiched between stepped portions 941*c* and 943*d*, and 941*d* and 943*c* at both ends of a pair of horizontal reflector plates 941 and 943, respectively, in such a manner as to form a tubular body having a substantially rectangular cross-section.

In the case of an optical rod as shown in FIG. 9, since the dimensional accuracy of inner walls of the optical rod is greatly affected by the dimensional accuracy of end surfaces 942*a* and 942*b*, and 944*a* and 944*b* of the vertical reflector plates 942 and 944, respectively, and the dimensional accuracy of the step portions 941*c* and 941*d*, and 943*c* and 943*d* of the horizontal reflector plates 941 and 943, respectively, precise machining, including polishing, is required on both the horizontal reflector plates and the vertical reflector plates.

It is essential to precisely control the angle and the spacing of the reflecting surfaces of an optical rod in order that the beams subjected to internal reflections in the optical rod may be uniformly superposed on the surface at the end from where the beams emerge. For this reason, the conventional art 1 requires high-precision machining, including polishing, because the dimensional accuracy of the inner walls of the optical rod is greatly affected by that of the end surfaces 932*a* and 932*b*, and 934*a* and 934*b* of the vertical reflector plates 932 and 934, respectively. Optical rods of this type are vulnerable to an external force applied to the vertical reflector plates in the vertical direction, and particularly so in the case where the width of the horizontal reflector plate (that is, the distance between the two end surfaces of the horizontal reflector plate, for instance, the distance between 931*a* and 931*b*) is made longer than the normal width. Such a variance in the width results in insufficient adhesive strength because the space where the adhesive is applied becomes reduced, thus making the optical rod more vulnerable to external forces.

In the conventional art 2, although it is possible to increase the strength of the optical rod against an external force exerted on the vertical reflector plates in the vertical direction, the shape of the horizontal reflector plates then becomes more complicated, resulting in such disadvantages as the more precise machining requirements by polishing a larger area more portions, difficult machining and higher costs.

SUMMARY OF THE INVENTION

Accordingly, it is an object of the present invention to solve the foregoing problems by providing an optical rod formed of reflector plates which can be manufactured more quickly and at lower cost by reducing the processing costs (processing costs of original plates) while maintaining the required performance of the optical rod.

Another object of the invention is to provide a novel method of manufacturing optical rods and jigs for manufacturing them.

A further another object of the invention is to provide a projector equipped with such an optical rod. An optical rod disclosed in the present invention is formed into a tubular body having a substantially rectangular cross-section which is made of a plurality of flat plates each having a light reflecting surface thereon, with the light reflecting surfaces turned inward. On each of the plurality of flat plates, an end surface of one of the flat plates at one end is held in contact with the surface of another of the flat plates adjacent to the same end, and the surface thereof at the other end is held in contact with an end surface of another of the flat plates adjacent to the other end.

Such an arrangement allows adjustment of the length of one side of a substantially rectangular optical rod at the contact position on the flat plate adjacent to the other end. Consequently, a tubular body of substantially rectangular cross-section can be configured to desired dimensions, regardless of the accuracy of the distance between the two end surfaces of a flat plate (hereinafter referred to as "width of the flat plate"). This results in the realization of an optical rod having stable performance. Moreover, this also makes it possible to provide an optical rod which is easier to assemble and low in price due to the reduced processing costs since there are fewer portions requiring polishing on the flat plates.

In the contact portions, each of the plurality of flat plates is preferably disposed in such a manner that the end portion of one of the flat plates at one end extends beyond the rear surface of another of the flat plates adjacent to the same end.

By this arrangement, since the entire end surface of the flat plate is held in contact with the surface of another flat plate at the same end, reliable alignment between each flat plate is achieved so as to make the contact stable, thereby enhancing the strength of the optical rod.

On the outside of the tubular body, the plurality of flat plates are preferably bonded with each other in such a manner that the rear surface of one flat plate at one end is bonded to the surface of the extended end portion on another flat plate adjacent to the flat plate at the same end.

In this arrangement, since each of the plurality of flat plates is bonded in such a manner that an adhesive is applied on the rear surface at one end and on the front surface on the other end, sufficient area for applying the adhesive is ensured so as to enable reliable bonding. Accordingly, the bonding strength is improved in comparison with the case where just a part of the end surface of a flat plate is bonded with an adhesive. As a result, it is possible to prevent problems including misalignment of flat plates and resulting deterioration in accuracy of the optical rod.

Preferably, the plurality of flat plates are made of glass, the surface of which has a light reflection coating deposited thereon.

By such an arrangement, each flat plate is provided with high flatness and high light reflectivity, so that the optical rod can maintain stable performance over long periods of time due to uniform light reflectivity and reduced heating.

Each of the plurality of flat plates is preferably polished only on one end surface at one end.

By the polishing step, the end surface of each flat plate at one end, that is, the end surface to be kept in contact with another flat plate, is made flat, consequently improving the adhesiveness between surfaces. Moreover, since the angle of the end surface with respect to the main surface is made uniform on each of the plurality of flat plates, each flat plate can be brought into accurate and reliable contact with another. Furthermore, since polishing is required only on the end surface at one end while a number of flat plates are stacked on each other, the enhanced workability results in a reduction in the machining costs of the flat plates.

Since polishing on the end surface is performed (plane polishing) for the purpose of achieving the flatness of the end surface at one end and the desired angle with respect to the main surface (namely, the light reflecting surface), polishing is not needed for the purpose of obtaining an accurate width (follow-up polishing), thereby resulting in a reduction in time required for polishing.

The manufacturing method of an optical rod disclosed in the present invention relates to a manufacturing method of an optical rod wherein a plurality of flat plates, each having a light reflecting surface thereon, form a tubular body of substantially rectangular cross-section, with the surfaces facing inward, and the manufacturing method includes a securing step of each of the plurality of flat plates wherein an end surface of one of the flat plates at one end is held and secured in contact with the surface of another of the flat plates adjacent to the flat plate at the same end and the surface of the flat plate at the other end is held and secured in contact with an end surface of another of the flat plates adjacent to the flat plate at the other end.

By this arrangement, the length of one side of the optical rod having a substantially rectangular cross-section can be adjusted by adjusting the contact position of a flat plate adjacent to the flat plate at the other end. Consequently, the configuration of a tubular body having a substantially rectangular cross-section can be manufactured with ease in desired dimensions, independent of the accuracy in the width and length of the flat plate. It follows that there is no need for precise trimming by polishing the end surfaces or by other means to obtain the accurate width of each flat plate, thus resulting in a reduction in the time required for processing a flat plate by polishing or by other means. As a result, low-cost optical rods can be provided by the use of flat plates which can be manufactured quickly and with reduced processing costs.

In the securing step for each of the plurality of flat plates, it is preferable that the end portion of one flat plate at one end extend beyond the rear surface of another flat plate adjacent to the flat plate at the same end.

By this arrangement, the entire end surface of the flat plate at the one end is held in close contact with the surface of another flat plate adjacent to the flat plate at the same end. This makes alignment between the flat plates easy and reliable to enable rapid contacting.

The manufacturing method preferably includes a bonding step wherein the plurality of flat plates are bonded with each other on the outside of the tubular body in such a manner that a rear surface of one flat plate at one end is bonded to the surface on the extended end portion of another flat plate adjacent to the flat plate at the same end.

In this arrangement, an adhesive can be applied from the outside of the contact portion on the rear surface at one end and on the front surface at the other end on each flat plate. For this reason, reliable bonding of the flat plates can be realized without concern for excessive application of adhesive on a surface of the flat plate, thereby enabling quick and straightforward contacting.

Preferably, each of the plurality of flat plates is made of glass and the method includes a deposition step for depositing a light reflection coating on the surface.

By the deposition process, each flat plate is provided with high flatness and high light reflectivity to allow the optical rod to maintain stable performance for a long time by assuring uniform light reflectivity and suppressing heating.

It is preferable that the manufacturing method include a polishing process for polishing each of the plurality of flat plates only on the end surface at one end.

Since polishing can be performed only on the end surface at one end while a plurality of flat plates are stacked on each other, the workability is enhanced, thereby resulting in a reduction in the machining cost of the flat plates.

More specifically, polishing on the end surface is performed for the purpose of polishing to achieve the flatness of the end surface at one end and to assure an accurate angle of the end surface with respect to the main surface (namely, the light reflecting surface). For this reason, polishing is not needed for the purpose of achieving an accurate width (follow-up polishing), thereby resulting in a reduction in the time required for polishing.

In this way, the end surface of each flat plate at one end, that is, the end surface to be held in contact with another flat plate, is made flat to improve the adhesiveness with the surface. On the other hand, since the angle of the end surface with respect to the main surface is made uniform on each of the plurality of flat plates, the flat plates can be brought into accurate and reliable contact with each other. In addition, since polishing is performed only on the end surface at one end while a plurality of flat plates are stacked on each other, the polishing is performed more easily and more quickly. Furthermore, since polishing is not performed on the end surface that has no influence on the configuration of the optical rod of substantially rectangular cross-section, the processing costs of the optical rod can be reduced.

It is preferable that the manufacturing method include a core expansion step wherein cores are expanded by inserting spacers into gaps formed between the inner side surfaces of a plurality of cores so that the outer surfaces thereof may form a post having a substantially rectangular cross-section, a flat plate arranging step wherein the surfaces of the flat plates are set on the outer surfaces of the post having a substantially rectangular section; a core reduction step wherein the cores are reduced in size by removing the spacers after forming the tubular body, and a tubular body removal process for removing the tubular body when the cores are reduced.

Since such a method makes it possible to form a tubular body of a desired size just by arranging the surfaces (light reflecting surfaces) on the outer surfaces of the post of substantially rectangular cross-section formed of a plurality of cores, the accuracy of the tubular body (accuracy in the disposition of each flat plate) is assured and the arrangement becomes faster.

Moreover, due to the step wherein the spacers of the cores are removed and the cores are detached from the flat plates after the tubular body is formed, friction is prevented between the surfaces of the flat plates and the cores, and the optical rod can be removed from the cores quickly and easily, thus preventing damage to the surfaces of the flat plates.

It is preferable that the manufacturing method include a flat plate suction step for holding the flat plates on the outer surfaces of the post of substantially rectangular cross-section by suction.

This process makes it possible to temporarily fix the thus-arranged flat plates until they are completely secured or bonded. Consequently, the flat plates do not move (are not misaligned), so that they are secured or bonded in desired dimensions so as to provide a highly-accurate tubular body (accuracy in the positioning of each flat plate) and speed up the arranging of the flat plates.

It is preferable that the manufacturing method include an air blowing step for blowing air onto the surfaces of the flat plates after forming the tubular body.

Since this step enables a reduction of the expanded cores quickly and easily after forming the tubular body, the manufacturing efficiency of optical rods is enhanced.

A manufacturing jig for manufacturing an optical rod according to the present invention relates to a manufacturing jig for manufacturing an optical rod formed in a tubular body of substantially rectangular cross-section wherein a plurality of flat plates having light reflecting surfaces are disposed with the surfaces facing inward. The manufacturing jig includes a plurality of substantially polygonal posts and spacers insertable between the plurality of substantially polygonal posts, wherein the plurality of substantially polygonal posts are connected by the spacers so as to form a post of substantially rectangular cross-section.

Such an arrangement enables the formation of a post of substantially rectangular cross-section and simple construction in accurate dimensions which can be easily disassembled. More specifically, a plurality of substantially polygonal posts can be connected and separated with ease just by inserting/extracting the spacers to allow the formation of a post of substantially rectangular cross-section of a desired size when the plurality of substantially polygonal posts are connected.

The use of such a manufacturing jig facilitates the manufacturing of optical rods and enables manufacturing of optical rods with stable quality. In addition, the manufacturing jig itself is low-cost and can be operated with ease (expanded and reduced), which in turn reduces the costs of the optical rods.

A projector incorporating an optical rod according to the present invention includes a light source and an illumination light source system equipped with a device for making uniform the irradiation of light emitted from the light source, a color separation optical system for separating the light emitted from the illumination light source system into specified colored light beams, a light modulating device for carrying out color modulation of each colored light beam from the color separation optical system according to image information, and a projector lens for projecting light beams modulated by the light modulating device, wherein a device making the irradiation of the lights uniform is the optical rod as described above.

The use of low-cost and high quality optical rods provided according to the foregoing method enables a reduction in the manufacturing costs of the projector and realizes uniform brightness on a projection area.

DESCRIPTION OF THE PREFERRED EMBODIMENTS

Optical Rod

Figure 1:
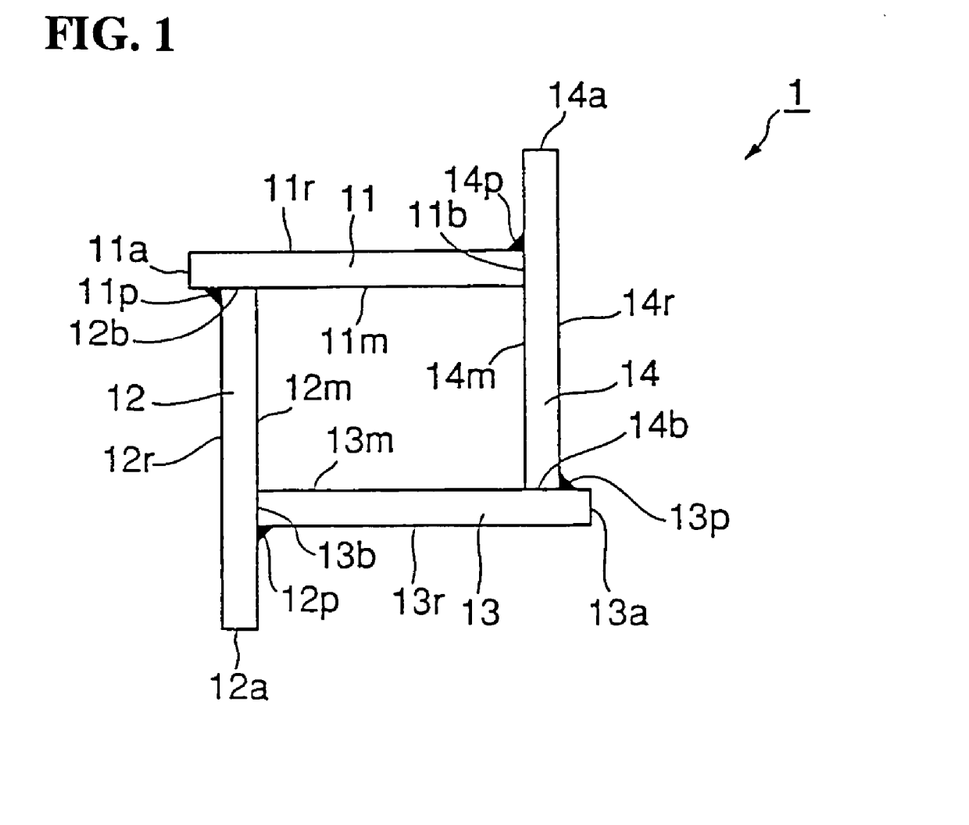
FIG. 1 is an elevation view of an optical rod according to an embodiment of the present invention.

FIG. 1 is an elevation view illustrating an optical rod according to an embodiment of the present invention. In FIG. 1, reference numeral 1 represents an optical rod, reference numerals 11 and 13 represent a pair of horizontal reflector plates, and reference numerals 12 and 14 represent a pair of vertical reflector plates. It should be understood that the names horizontal reflector plate and vertical reflector plate are used merely for convenience of explanation; in practice, the plates may be inclined with respect to each other during manufacture, usage or at another time, and in some cases horizontal reflector plates may be vertically disposed.

The horizontal reflector plate 11, the vertical reflector plate 12, the horizontal reflector plate 13 and the vertical reflector plate 14 (which hereinafter may be collectively referred to as "reflector plates") are all rectangular glass plates of the same size, with one main surface having a light reflection coating deposited thereon (hereinafter referred to as "light reflecting surface") and one end surface polished (hereinafter referred to as "polished end surface").

The other surface, which has no light reflection coating deposited thereon, is referred to as the "rear surface" and the unpolished end surface is referred to as the "cut end surface".

The rectangular glass plates may differ in size.

The optical rod 1 is formed of four reflector plates with their respective light reflecting surfaces turned inward and with the polished end surface of one flat plate held in contact with the light reflecting surface of another flat plate.

The number of flat plates used need not be four; any plural number of flat plates may be used provided that they can form an optical rod formed of a tubular member having a substantially rectangular cross-section. Further details are given below.

Referring to the vertical reflector plate 12, a light reflecting surface 12m faces inward (faces to the right in the drawing) and a polished end surface 12b is held in contact with a light reflecting surface 11m of the horizontal reflector plate 11. A cut end surface 11a of the horizontal reflector plate 11 extends beyond a rear surface 12r of the vertical reflector plate 12 and the corner where the rear surface 12r comes into contact with the light reflecting surface 11m has an adhesive 11p applied thereto to bond them.

In a similar fashion, a light reflecting surface 13m of the horizontal reflector plate 13 faces inward (faces upward in the drawing) and a polished end surface 13b thereof is held in contact with the light reflecting surface 12m of the vertical reflector plate 12. A cut end surface 12a of the vertical reflector plate 12 extends beyond a rear surface 13r of the horizontal reflector plate 13 and the corner where the rear surface 13r comes into contact with the light reflecting surface 12m has an adhesive 12p applied thereto to bond them.

Referring to the vertical reflector plate 14, a light reflecting surface 14m faces inward (faces to the left in the drawing) and a polished end surface 14b is held in contact with the light reflecting surface 13m of the horizontal reflector plate 13. A cut end surface 13a of the horizontal reflector plate 13 extends beyond a rear surface 14r of the vertical reflector plate 14 and the corner where the rear surface 14r comes into contact with the light reflecting surface 13m has an adhesive 13p applied thereto to bond them.

Referring to the horizontal reflector plate 11, the light reflecting surface 11m faces inward (faces downward in the drawing) and a polished end surface 11b is held in contact with the light reflecting surface 14m of the vertical reflector plate 14. A cut end surface 14a of the vertical reflector plate 14 extends beyond a rear surface 11r of the horizontal reflector plate 11 and the corner where the rear surface 11r comes into contact with the light reflecting surface 14m has an adhesive 14p applied thereto to bond them.

Due to the configuration as described and illustrated above, the optical rod 1 provides the following advantages.

(i) The accuracy of the distance between each of the light reflecting surfaces can be improved regardless of the accuracy of the width (that is, the distance between the polished end surface and the cut end surface) of a reflector plate (original plate before assembly), and therefore, lower costs can be achieved for the optical rod due to the use of a reflector plate requiring lower processing costs.

(ii) Since the entire surface of a polished end surface of one reflector plate is held in contact with a light reflecting surface of another reflector plate, reliable alignment is assured between the respective reflector plates. Furthermore, even if an external force is exerted, the force is received on the entire surface of the polished end surface, which reduces the load on the adhesive to allow reliable bonding therebetween.

(iii) Since an end portion of the rear surface and an end portion of the light reflecting surface are bonded with an adhesive, more reliable bonding is achieved than by bonding the end surfaces together. For this reason, even when an external force is exerted, the reflector plates do not move, thereby not causing deterioration in performance of the optical rod.

(iv) Since the reflector plate is made of glass having a light reflecting surface having a light reflection coating deposited thereon, the plate is provided with improved flatness and high reflection efficiency. These characteristics assure uniform light reflection and suppress heat buildup so as to assure stable performance of the optical rod over long periods of time.

(v) Since the reflector plate is polished only on the end surface at one end (polished end surface), polishing of a plurality of reflector plates stacked on each other can be performed at the same time, which leads to a reduction in the processing costs. In addition, since the polished end surface requires polishing just for the purpose of plane polishing to achieve the required surface flatness and angle, there is no need for follow-up polishing to achieve accuracy in the width dimension, thereby resulting in a reduction in the processing costs due to the reduced polishing time required.

(vi) Since the same width can be employed for the horizontal reflector plate and the vertical reflector plate, the same type of reflector plate (original plate) can be used for both, thereby enabling further cost reduction of the reflector plates.

(vii) Since optical rods of various sizes (having various distances between reflecting surfaces) can be manufactured by using reflector plates of specific sizes, further cost reduction of the original plates can be achieved by reducing the required number of types of reflector plate (original plate).

It is to be understood that the reflector plate of the present invention need not be a glass plate having a light reflection coating deposited thereon; it may be made of any material, and in some cases, it may have no deposited light reflection coating.

Manufacturing Method of Optical Rod

FIGS. 2A to 2C, FIGS. 3D to 3F, and FIGS. 4G to 4I are elevation views illustrating an embodiment of a manufacturing method of the optical rod described above. Referring to these drawings, reference numeral 100 represents a manufacturing jig, reference numerals 110 and 120 represent cores, and reference numerals 130 and 140 represent spacers.

Figure 2A:
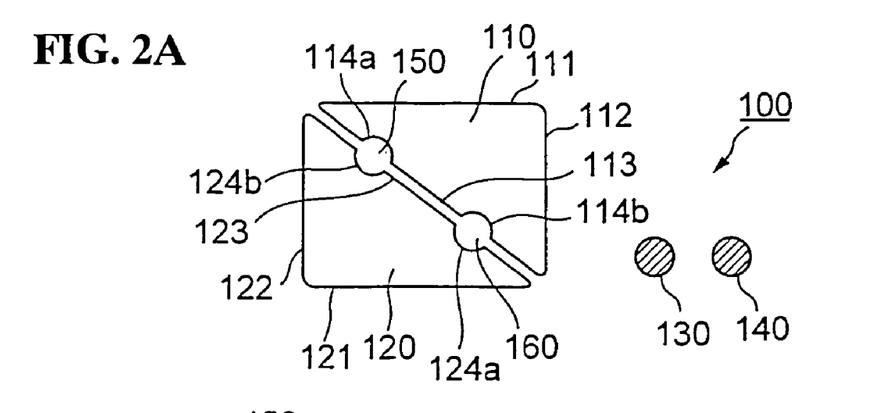
FIGS. 2A to 2C are elevation views illustrating an embodiment of a manufacturing method of the optical rod shown above.
Figure 2B:
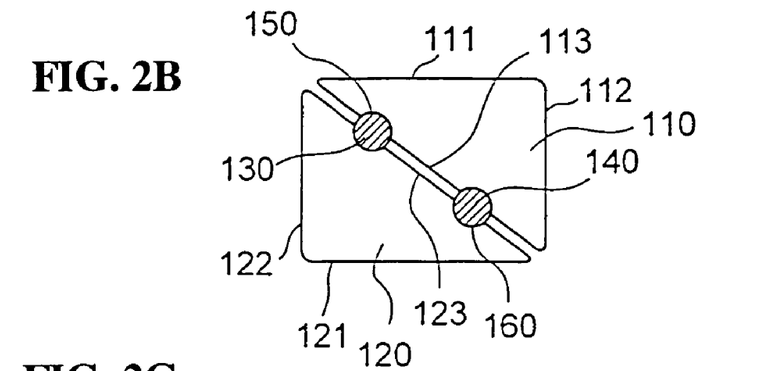
Figure 2C:
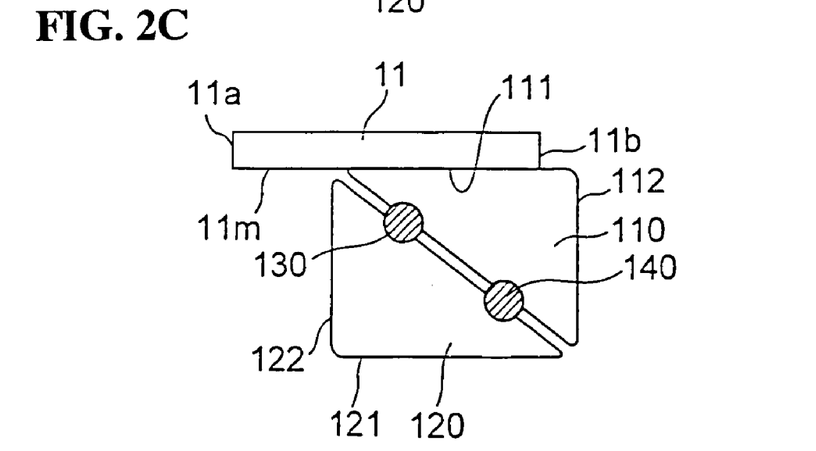

The cores 110 and 120 are right-angled triangular poles of the same shape having horizontal surfaces 111 and 121, vertical surfaces 112 and 122, and oblique surfaces 113 and 123, respectively (hereinafter the horizontal surfaces and the vertical surfaces may be collectively referred to as "outer side surfaces").

The oblique surfaces 113 and 123 are provided with two spacer guide grooves 114a and 114b of arc-shaped cross-section, and two spacer guide grooves 124a and 124b of arc-shaped cross-section, respectively. The spacer guide grooves 114a and 124b oppose each other to form a spacer guide hole 150 of a circle of elliptical cross-section, and the spacer guide grooves 114b and 124a oppose each other to form a spacer guide hole 160 of a circle of elliptical cross section.

The horizontal surfaces 111 and 121, and the vertical surfaces 112 and 122 are respectively provided with a suction port (not shown) so as to allow separate and independent air suction on each outer side surface.

The spacers 130 and 140 are posts having a circular cross-section, which are inserted into the spacer guide holes 150 and 160 by a insertion/extraction device (not shown).

FIG. 2A shows a standby process. The cores 110 and 120 are retained by a retaining device (not shown) with the oblique surfaces 113 and 123 in close proximity to each other.

FIG. 2B shows a manufacturing jig completion process. The spacer 130 is inserted into the spacer guide hole 150 and the spacer 140 is inserted into the spacer guide hole 160.

At this time, the horizontal surface 111 of the core 110 is positioned in parallel with the horizontal surface 121 of the core 120 while the vertical surface 112 of the core 110 is positioned in parallel with the vertical surface 122 of the core 120. These four outer surfaces form a post of substantially rectangular cross-section.

FIG. 2C shows a first step for arranging the reflector plates. The light reflecting surface 11m of the reflector plate 11 is held in contact with the horizontal surface 111 of the core 110 and the light reflecting surface 11m is held on the horizontal surface 111 by suction. At this time, the polished end surface 11b of the reflector plate 11 is recessed from the vertical surface 112 of the core 110.

Figure 3D:
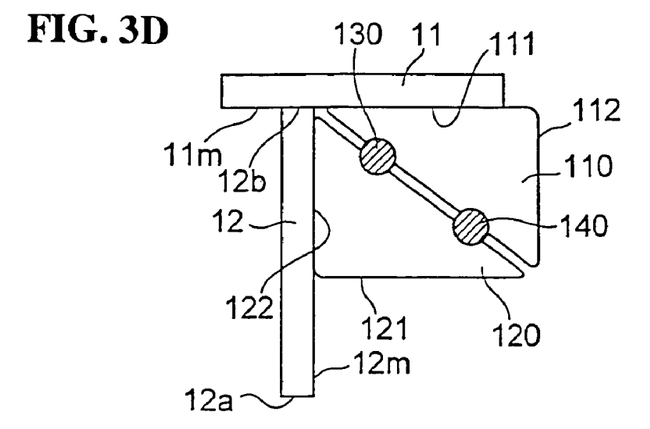
FIGS. 3D to 3F are elevation views illustrating an embodiment of a manufacturing method of the optical rod shown above.

FIG. 3D shows a second step for arranging the reflector plates. The light reflecting surface 12m of the reflector plate 12 is held on the vertical surface 122 by suction, with the light reflecting surface 12m held in contact with the vertical surface 122 of the core 120 and with the polished end surface 12b in contact with the light reflecting surface 11m of the reflector plate 11.

When doing this, the reflector plate 12 may be slid on the vertical surface 122 (upward in the drawing) while applying weak suction to the light reflecting surface 12m and then applying full suction when the polished end surface 12b comes into contact with the light reflecting surface 11m. Alternatively, it may be slid on the light reflecting surface 11m (toward the right in the drawing) while weakly pressing the polished end surface 12b against the light reflecting surface 11m and then applying full suction when the light reflecting surface 12m comes into contact with the vertical surface 11m.

Figure 3E:
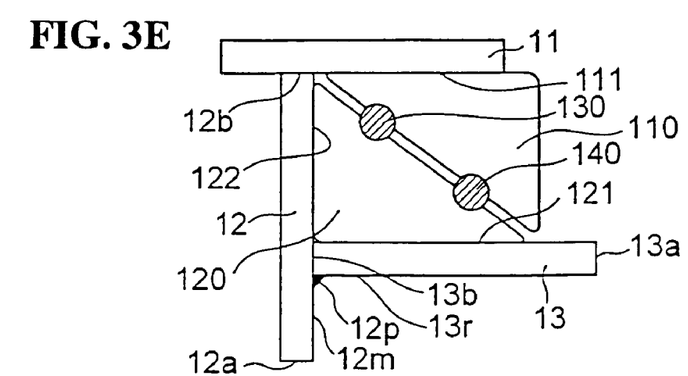

FIG. 3E shows a third step for arranging the reflector plates. The reflector plate 13 is set in place in the same way as in the second step. At this time, the cut end surface 12a of the reflector plate 12 is extended beyond the rear surface 13r of the reflector plate 13. The adhesive 12p is applied to the corner where the rear surface 13r comes into contact with the extended light reflecting surface 12m to bond both end portions.

Figure 3F:
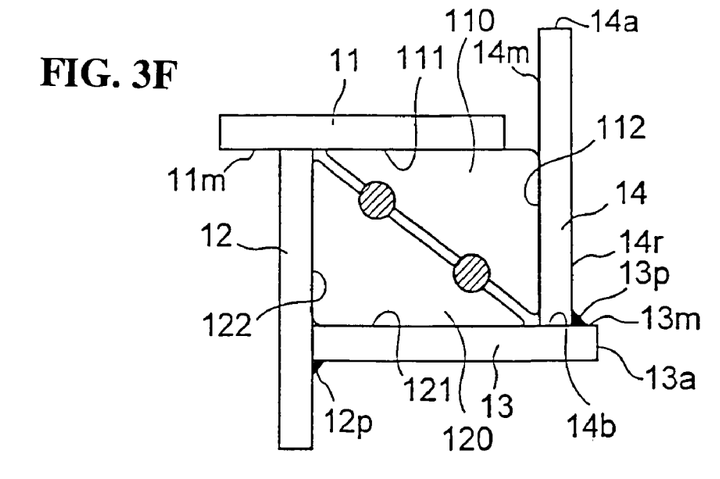

FIG. 3F shows a fourth step for arranging the reflector plates. The reflector plate 14 is set in place in the same way as described in the third step. The adhesive 13p is applied to the corner where the rear surface 14r comes into contact with the extended light reflecting surface 13m to bond both end portions.

Figure 4G:
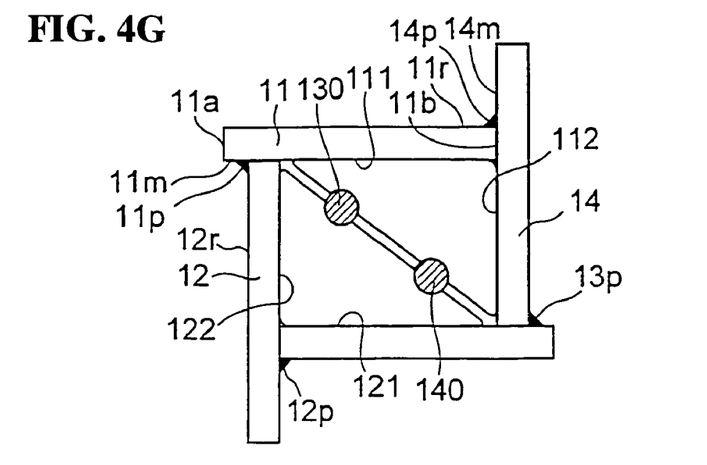
FIGS. 4G to 4I are elevation views illustrating an embodiment of a manufacturing method of the optical rod shown above.

FIG. 4G shows a fifth step for arranging the reflector plates. While the suction force of the reflector plate 11 shut off or reduced, the polished end surface 11b is brought into contact with the light reflecting surface 14m of the reflector plate 14 and the light reflecting surface 11m is held on the horizontal surface 111 by suction.

Then the adhesive 14p is applied to the corner where the rear surface 11r comes into contact with the extended light reflecting surface 14m to bond both end portions to each other. Likewise, the adhesive 11p is applied to the corner where the rear surface 12r of the reflector plate 12 comes into contact with the extended light reflecting surface 11m of the reflector plate 11 to bond both end portions to each other.

Figure 4H:
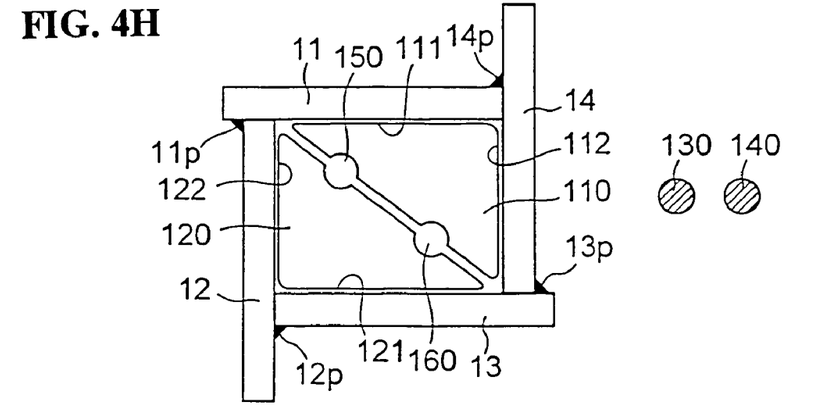

FIG. 4H shows a jig reduction step for reducing the size of a manufacturing jig by reducing the distances between the outer side surfaces of the jig. Suction for holding each light reflecting surface onto a corresponding side surface of the manufacturing jig 100 is shut off and the spacers 130 and 140 are removed from the spacer guide holes 150 and 160. As a result, the horizontal surfaces 111 and 121 and the vertical surfaces 112 and 122 are drawn closer to each other. Then the light reflecting surfaces of the reflector plates forming a body having a rectangular cross-section (the same as the optical rod 1) are detached from each outer side surface of the core so as to allow easy removal of the manufacturing jig 100 from the optical rod 1. At this time, air may be blown out from the suction port (not shown).

Figure 4I:
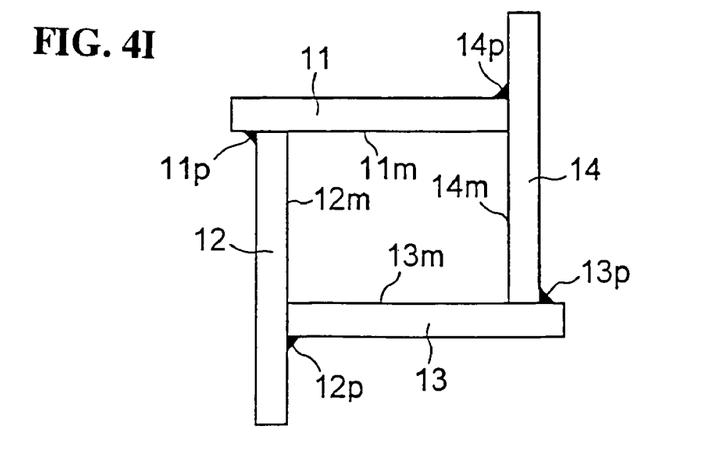

FIG. 4I shows the completed optical rod 1. Further explanation is not given since it is the same as that shown in FIG. 1.

Although the foregoing description is given with reference to a method in which bonding is performed in each step for setting the reflector plates, the present invention is not restricted to such a method; a method in which all the reflector plates are bonded at the same time after setting the reflector plates may be used.

Since the manufacturing method of the optical rod is characterized as described and shown above, it provides the following advantages.

(viii) The optical rod can be manufactured quickly since the reflector plates can be set simply by placing the light reflecting surface of one reflector plate in contact with the outer side surface of the core and by placing the polished end surface in contact with the light reflecting surface of another reflector plate. Furthermore, the performance of the light reflecting surface is improved since the required accuracy of the light reflecting surface can be achieved independent of the accuracy of the width of the reflector plate.

(ix) Since the entire polished end surface of one reflector plate is held in close contact with the light reflecting surface of another reflector plate and an adhesive is applied over the end portions on the reflector plates, bonding can be performed quickly and easily.

(x) Since the manufacturing jig is formed of a simple and adjustable (extendable/retractable) core, it can be manufactured with ease and at low cost. Furthermore, since an optical rod can be quickly removed with ease after assembling it into a tubular body by reducing the dimensions between the outer side surfaces of a post having a substantially rectangular cross-section (by drawing the cores nearer), the effectiveness of the manufacturing jig is enhanced. Furthermore, since the cores form a post having a substantially rectangular cross-section with accurate dimensions, the performance of the optical rod is improved due to the enhanced accuracy of the light reflecting surfaces.

(xi) Since the reflector plate (original plate) set in place is held on the outer side surface of the core by suction, the reflector plate does not move (is not misaligned) until bonding is complete, and reliable bonding is achieved so that the required accuracy of the light reflecting surface is assured, thereby enhancing the performance of the optical rod.

(xii) In addition, independent suction can be applied separately to each reflecting surface and positioning can be adjusted for each reflecting surface, thereby simplifying the positioning of the reflecting surfaces.

When air is blown out from the suction port for removing the spacers, the expanded core can be quickly reduced with ease.

Manufacturing Jig of Optical Rod

Figure 5A:
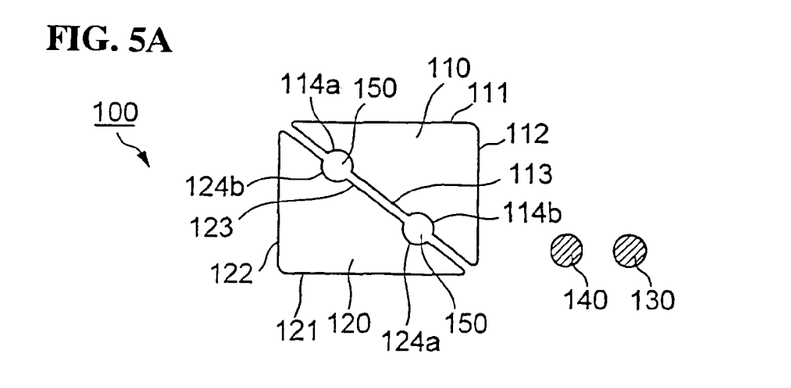
FIGS. 5A to 5C are elevation views illustrating embodiments of a manufacturing jig of the optical rod shown above.
Figure 5B:
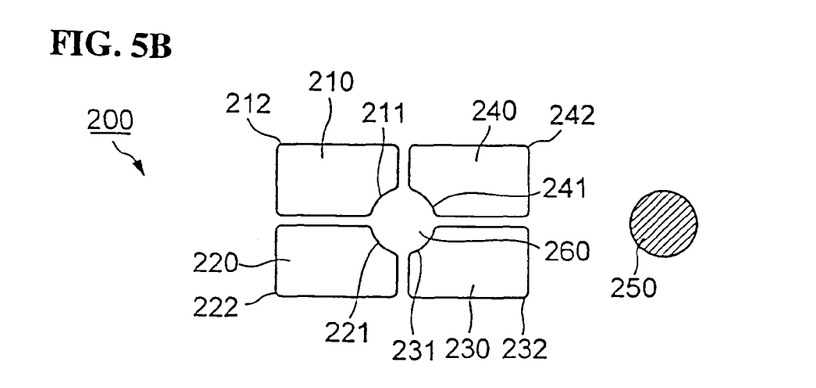
Figure 5C:
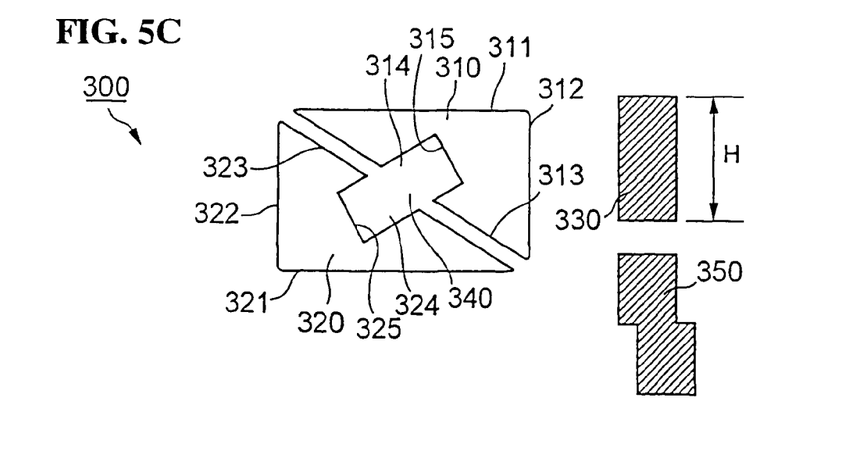

FIGS. 5A to 5C are elevation views illustrating embodiments of a manufacturing jig of an optical rod. Referring to FIG. 5A, a manufacturing jig 100 comprises a pair of cores 110 and 120 each made of a right-angled triangular post and a pair of spacers 130 and 140 each made of a post of circular cross-section.

Each outer side surface (horizontal surfaces 111 and 121 and vertical surfaces 112 and 122) of the core 110 and 120 has a corresponding air suction port (not shown). Terminal suction channels connected with them are organized into four branch suction channel systems, one for each outer side surface. Each branch suction channel is furnished with a shutoff valve or a pressure-regulating valve. The four branch suction channel systems are put together into one trunk suction channel system and connected with suction means (not shown).

Some cores may have approaching means for drawing the pairs of cores closer (like a pulling spring) on the oblique surfaces or the edges of the cores (edges in the depth direction in the drawing).

As described and shown above, a manufacturing jig of simple construction can be provided at low cost, which is formed of posts of substantially rectangular cross-section and with accurate dimensions.

FIG. 5B shows a manufacturing jig having four cores and one spacer. In FIG. 5B, reference numeral 200 represents a manufacturing jig, reference numerals 210, 220, 230 and 240 represent cores formed of square posts, and reference numeral 250 represents a spacer of a post having a circular cross-section.

The cores 210, 220, 230 and 240 are formed of square posts of the same shape, having rounded portions 211, 221, 231 and 241 at one of their corners, respectively. When the four square posts are set in place with the rounded portions at the center, a spacer guide hole 260 is formed into which a spacer 250 can be inserted. Each of the rounded portions 211, 221, 231 and 241 forms an arc-shaped recess whose radius is substantially the same as that of the cross-section of the spacer 250. The spacer guide hole 260 is not circular before the spacer 250 is inserted.

The shape of each core may be different and the number of cores may be chosen depending on the shape of the core, provided that an optical rod of the desired shape can be formed on the outer profile formed by the combined cores.

When the spacer 250 is inserted into the spacer guide hole 260, the rounded portions. 211, 221, 231 and 241 come into contact with the circumference of the spacer 250. This causes the formation of a post of substantially rectangular cross-section having four corners 212, 222, 232 and 242, each opposed to rounded portions of the cores 210, 220, 230 and 240.

Thus, as with the method shown by FIG. 5A, this method also provides a manufacturing jig of simple construction at low cost which is highly effective.

The spacer 250 may be of a body having a square cross-section or diamond-shaped cross-section and the core may be edged with a flat surface (chamfered). The spacer 250 may have a cross-shaped cross-section and be inserted between opposing surfaces of each square pole. Chamfering or rounding is not essential for this method.

FIG. 5C shows a manufacturing jig formed of a pair of cores formed of right-angled triangular posts and a spacer formed of a post having a square cross-section. In FIG. 5C, reference numeral 300 represents a manufacturing jig, reference numerals 310 and 320 represent cores, and reference numeral 330 represents a spacer. The cores 310 and 320 are formed of right-angled triangular posts of the same shape and have horizontal surfaces 311 and 321, vertical surfaces 312 and 322, and oblique surfaces 313 and 323, respectively (horizontal surfaces and vertical surfaces may be collectively referred to as "outer side surfaces" hereinafter).

The oblique surfaces 313 and 323 are provided with spacer guide grooves 314 and 324 of rectangular cross-section, respectively. The spacer guide groove 314 and 324 oppose to form a spacer guide hole 340 of rectangular cross-section.

By inserting the spacer 330 into the spacer guide hole 340, the horizontal surface 311 of the core 310 is aligned in parallel with the horizontal surface 321 of the core 320 and the vertical surface 312 of the core 310 is aligned in parallel with the vertical surface 322 of the core 320, thereby forming a post having a substantially rectangular cross-section with four thus-aligned outer side surfaces.

Since the distances between the outer side surfaces of the post of substantially rectangular cross-section equals the distances between the light reflecting surfaces of an optical rod, the distances between the light reflecting surfaces of the optical rod may be varied by changing the height of the spacer 330 (shown by "H" in the drawing) or by changing the cross-sectional shape of the spacer to a two-tiered shape, as shown in the drawing (spacer 350).

As with the method shown in FIG. 5A, this method also provides a manufacturing jig of simple construction at low cost that can be conveniently used and that facilitates changes in distances between the light reflecting surfaces.

Furthermore, the depth of the spacer guide grooves 314 and 324 may be changed linearly (that is, base surfaces 315 and 325 are tapered) and the spacer 330 may be a tapered pole (the spacer is linearly tapered in the height H direction at the same taper angle as the taper angle of the base surfaces 315 and 325). By changing the insertion depth of the spacer 330 (the distance in the depth direction in the drawing), the distances between the outer side surfaces of the post of substantially rectangular cross-section formed by the cores 310 and 320 can be changed. Accordingly this method provides a manufacturing jig which can be used to manufacture optical rods of various sizes (having different distances between light reflecting surfaces) by the use of one spacer.

As set forth hereinabove, the manufacturing jig according to the present invention provides the following advantages.

(xiv) The simple construction thereof achieves reduced costs and enhanced convenience.

(xv) Since the cores form a post of substantially rectangular cross-section with accurate dimensions, the required accuracy of the light reflecting surfaces is assured, thereby improving the performance of the optical rod.

Projector

Figure 6:
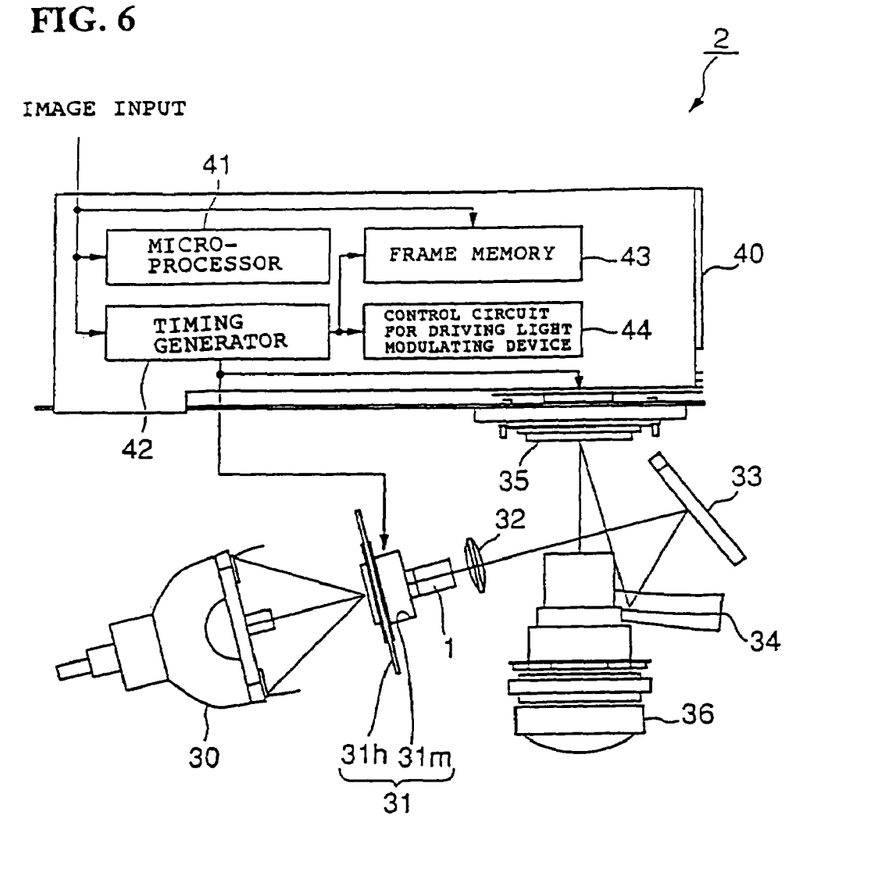
FIG. 6 is a block diagram illustrating an embodiment of a projector configuration incorporating the optical rod shown above.

FIG. 6 is a block diagram illustrating an example of the configuration of a projector. More specifically, FIG. 6 shows a projector (color display) 2 utilizing the optical rod 1 described above (integrator rod) comprising a light source 30 emitting light; a spectral instrument 31 including a motor 31m and a color wheel 31h for separating the light emitted from the light source 30; the optical rod 1 for making the illuminance uniform by mixing and integrating the light from the spectral instrument 31; a condensing lens 32; a mirror 33 reflecting the light from the condensing lens 32; a mirror 34 directing the light reflected by the mirror 33 onto a light modulating device 35; the light modulating device 35 producing color images corresponding to the colored light incident via the mirror 34; a projector lens 36 for receiving and projecting the light reflected and modulated by the light modulating device 35; and a control circuit controlling these operations.

The control circuit of the projector 2 is equipped with a drive circuit 40 including a microprocessor 41, a timing generator 42, a frame memory 43, and a drive-and-control circuit 44 for the light modulating device. In this projector, the timing generator 42 controls the rotation of the color wheel 31h and the timing for driving the light modulating device 35.

More specifically, firstly image signals are sampled by a sampling circuit (not shown). Then synchronized signals in image input signals are sent to the microprocessor 41 and the timing generator 42. At the same time, image data in the image signals are written in the frame memory 43 controlled by the timing generator 42. When the light emitted from the light source 30 passes through the color wheel 31h, which is rotated in synchronization with the display timing of the light modulating device 35, a projection light source is generated in the same color sequence as the display data colors, which is irradiated onto the light modulating device 35 after passing through the optical system described above. Respective colored light beams irradiated on the light modulating device 35 are subjected to light modulation by the light modulating device 35, and are magnified and projected via the projector lens 36 to display color images on the screen.

Such a projector as set forth above provides the following advantage.

(xvi) Due to the use of an optical rod according to the present invention, which can be manufactured at low costs and assured of high performance, the projector enables the manufacturing costs to be reduced, and provides adequate brightness and uniform illuminance over the entire surface of the projected image.

While the invention has been particularly shown and described with reference to the preferred embodiments and configuration thereof, it will be understood that other changes in form and details can be made therein without departing from the spirit and scope of the invention. Such changes may include:

(1) Although the embodiment described and shown above uses the spectral instrument 31 equipped with the motor 31m and the color wheel 31h for dividing the light emitted from the light source 30 into a plurality of partial luminous fluxes, the invention can be applied to a projector that does not use such a spectral instrument. A dichroic mirror or a dichroic prism may be used as spectral means.

(2) Referring to the light modulating device 35, the present invention can also be applied to a projector incorporating modulator means, such as ferroelectric liquid crystal, anti-ferroelectric liquid crystal, π cell-mode liquid crystal, TN liquid crystal, and OCB-mode liquid crystal as well as a mirror-type light modulating devices.

(3) Although the embodiment of a projector using one light modulating device is shown and described in the foregoing embodiment, the present invention can be applied to a projector using two, three, four or more light modulating devices.

(4) The foregoing embodiment refers to a projector using a mirror-type light modulating device, which is of a reflective type of a light modulating device. The present invention can be applied not only to a projector utilizing a reflective type of light modulating device but also a transmissive type of projector. The "transmissive type" of light modulating device refers to a light modulating device through which light passes, while the "reflective type" of light modulating device refers to a light modulating device from which light is reflected.

(5) There are generally two types of projector: a front-type projector whereby image projection is performed from the side where projected images are viewed and a rear-type projector whereby image projection is performed from the side opposite to where projected images are viewed. The configuration in the foregoing embodiment can be applied to both types of projector.

An optical rod according to the embodiment of the present invention can be incorporated in an illumination light source system for a variety of optical instruments and illumination instruments as a means of making the illuminance uniform (integrator rod) to improve the performance and reduce the manufacturing costs of these instruments.

As set forth herinabove, since the present invention enables improvement in performance and reduction in the manufacturing costs of an optical rod, the invention makes it possible to manufacture optical instruments such as projectors with higher performance and at lower cost by incorporating such an optical rod.

What is claimed is:

1. An optical rod including a plurality of flat plates, each flat plate having a light reflecting surface thereon, which form a tubular body of substantially rectangular cross-section with the surfaces thereof facing inward;
   wherein each of the plurality of flat plates is disposed in such a manner that an end surface of one of the flat plates at one end is held in contact with the surface of another of the flat plates adjacent to the same end, and the surface thereof at the other end is held in contact with the end surface of another of the flat plates adjacent to the other end, wherein
   each of the plurality of flat plates is disposed in such a manner that an end portion of one of the flat plates at one end extends beyond a rear surface of another of the flat plates adjacent to the same end at the contact portion of each flat plate.

2. An optical rod according to claim 1 wherein the plurality of flat plates are bonded to each other on the outer surfaces of the tubular body in such a manner that the rear surface of one of the flat plates at one end is bonded to the surface on the extended end portion of another of the flat plates adjacent to the same end.

3. An optical rod according to claim 2 wherein each of the plurality of flat plates is made of glass, the surfaces thereof having a light reflection coating deposited thereon.

4. An optical rod according to claim 2 wherein each of the plurality of flat plates is polished only on the end surface at one end.

5. An optical rod according to claim 1 wherein each of the plurality of flat plates is made of glass, the surfaces thereof having a light reflection coating deposited thereon.

6. An optical rod according to claim 5 wherein each of the plurality of flat plates is polished only on the end surface at one end.

7. An optical rod according to claim 1 wherein each of the plurality of flat plates is polished only on the end surface at one end.

8. A projector comprising:
   an illumination light source system including a light source and means for making uniform the irradiation of light emitted from the light source;

a color separation optical system for separating the light emitted from the illumination light source system into specified colored light beams;

a light modulating device for modulating each colored light beam emitted from the color separation optical system according to image information; and a projector lens for projecting the light beams modulated by the light modulating device, wherein the means for making the light irradiation uniform is the optical rod as described in claim 1.

9. A projector according to claim 8 wherein the plurality of flat plates of the optical rod are bonded to each other on the outer surfaces of the tubular body in such a manner that the rear surface of one of the flat plates at one end is bonded to the surface on the extended end portion of another of the flat plates adjacent to the same end.

10. A projector according to claim 9 wherein each of the plurality of flat plates of the optical rod is made of glass, the surfaces thereof having a light reflection coating deposited thereon.

11. A projector according to claim 9 wherein each of the plurality of flat plates of the optical rod is polished only on the end surface at one end.

12. A projector according to claim 8 wherein each of the plurality of flat plates of the optical rod is made of glass, the surfaces thereof having a light reflection coating deposited thereon.

13. A projector according to claim 12 wherein each of the plurality of flat plates of the optical rod is polished only on the end surface at one end.

14. A projector according to claim 8 wherein each of the plurality of flat plates of the optical rod is polished only on the end surface at one end.

15. A manufacturing method of an optical rod which is formed into a tubular body having a substantially rectangular cross-section with a plurality of flat plates each having a light reflecting surface, with the surfaces facing inward, the manufacturing method including a securing step for securing each of the plurality of flat plates in such a manner that an end surface of one of the flat plates at one end is secured in contact with the surface of another of the flat plates adjacent to the same end and the surface thereof at the other end is secured in contact with the end surface of another of the flat plates adjacent to the other end, wherein each of the plurality of flat plates is disposed in such a manner that an end portion of one of the flat plates at one end extends beyond a rear surface of another of the flat plates adjacent to the same end at the contact portion of each flat plate.

16. The manufacturing method of an optical rod according to claim 15 further including a bonding step wherein the plurality of flat plates are bonded to each other on the outer surfaces of the tubular body in such a manner that the rear surface of one of the flat plates at one end is bonded to the surface on the extended end portion of another of the flat plates adjacent to the same end.

17. The manufacturing method of an optical rod according to claim 15 wherein each of the plurality of flat plates is made of glass subjected to a deposition process, the manufacturing method further including a deposition step for depositing a light reflection coating on the main surfaces thereof.

18. The manufacturing method of an optical rod according to claim 15 further including a polishing step wherein each of the plurality of flat plates is polished only on an end surface at the one end.

19. The manufacturing method of an optical rod according to claim 15 further including:

a core expansion step wherein a core is expanded by inserting spacers into gaps formed between inner side surfaces of a plurality of cores so that the outer surfaces thereof may form a post having a substantially rectangular cross-section; a flat plate disposition process wherein the surfaces of the flat plates are set on the outer side surfaces of the post having the substantially rectangular cross-section;

a core reduction process wherein the cores are reduced by removing the spacers after forming the tubular body; and a tubular body removal process for removing the tubular body when the cores are reduced.

20. The manufacturing method of an optical rod according to claim 19 further including a flat plate suction process for holding the flat plates on the outer side surfaces of the post of substantially rectangular cross-section by suction.

21. The manufacturing method of an optical rod according to claim 19 further including an air blowing process for blowing air onto the surfaces of the flat plates after forming the tubular body.

22. A manufacturing jig for manufacturing an optical rod comprising a plurality of flat plates, each flat plate having a light reflecting surface, to form a tubular body of substantially rectangular cross-section with the surfaces facing inward, the manufacturing jig comprising:

a plurality of substantially polygonal cores;

spacers insertable between the plurality of substantially polygonal cores, wherein the spacers separate at least two of the substantially polygonal cores that are adjacent such that surfaces of the at least two adjacent cores do not touch when the spacers are inserted;

the plurality of substantially polygonal cores being connected by the spacers so as to form a post of substantially rectangular cross-section.

* * * * *